No. 650,825. Patented June 5, 1900.
A. W. COX & D. M. LELAND.
REFUSE BURNER.
(Application filed Jan. 29, 1900.)
(No Model.)
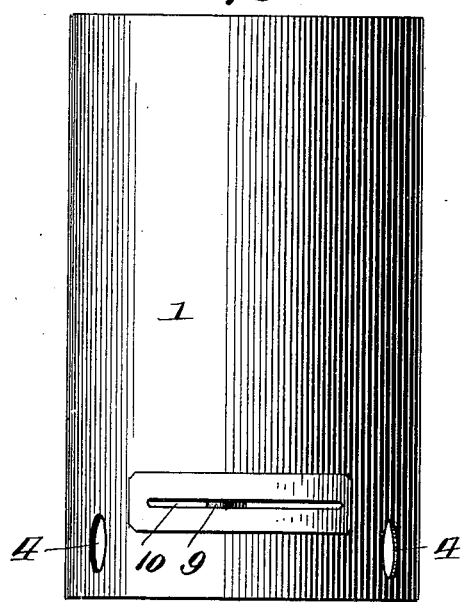
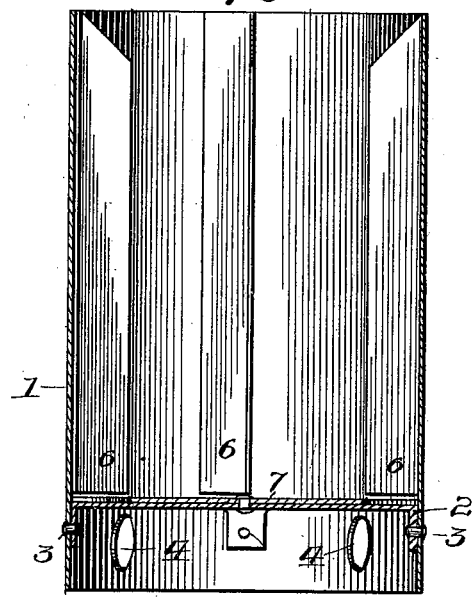
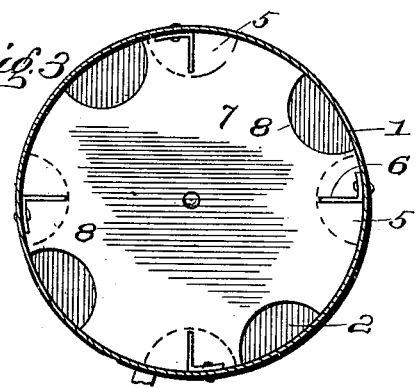
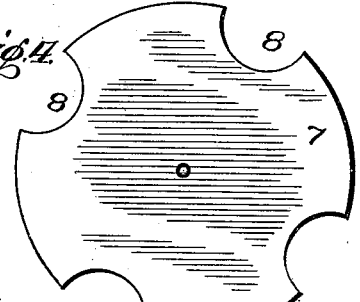
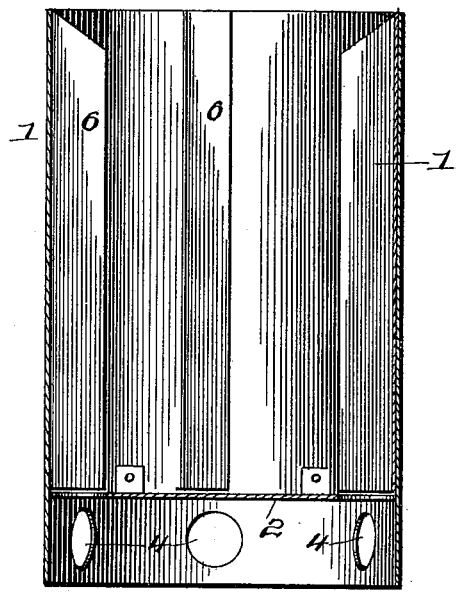
Witnesses
J. M. Fowler Jr.
Edw. J. Underwood
Inventors
Albert W. Cox
Davis M. Leland
By Johnston
Attorney

UNITED STATES PATENT OFFICE.

ALBERT WHITE COX AND DAVIS M. LELAND, OF CHICAGO, ILLINOIS.

REFUSE-BURNER.

SPECIFICATION forming part of Letters Patent No. 650,825, dated June 5, 1900.

Application filed January 29, 1900. Serial No. 3,162. (No model.)

*To all whom it may concern:*

Be it known that we, ALBERT WHITE COX and DAVIS M. LELAND, citizens of the United States, residing at Chicago, in the county of Cook and State of Illinois, have invented certain new and useful Improvements in Refuse-Burners; and we do hereby declare the following to be a full, clear, and exact description of the invention, such as will enable others skilled in the art to which it appertains to make and use the same.

The invention relates to improvements in stoves or burners, more especially that class for destroying or cremating trash or refuse. It has for its objects to promote the process or action of combustion, to increase efficiency, to facilitate the manipulation of the parts, to prevent the falling or dropping of the refuse or trash through the bottom of the burner or stove while filling or placing the same therein, and yet provide for admitting the requisite air or draft to the contents of said burner thereafter, and to otherwise promote utility, convenience, and facility.

It consists of a receptacle or cylinder having an elevated bottom with a series of radial or circumferential draft or air openings therein between it and the adjacent portions of said receptacle or cylinder, said cylinder also having air-inlets in its lower portion in a plane below its bottom; of a centrally or axially pivoted valve or disk arranged above and upon said bottom and leaving a series of circumferential or edge openings or recesses adapted to be alined or registered with the aforesaid openings; and of a series of vertical or radial edgewise-disposed ribs or offsets arranged upon the inside of said receptacle or cylinder, preferably about centrally with relation to the openings in said bottom, said ribs or offsets being preferably right-angled in cross-section, all substantially as hereinafter more fully disclosed, and specifically pointed out in the claims.

In the accompanying drawings, illustrating the preferred embodiment of our invention, Figure 1 is a side elevation. Fig. 2 is a longitudinal section. Fig. 3 is a horizontal section. Fig. 4 is a detached view of the valve or disk adapted to coöperate with the bottom of the burner. Fig. 5 is a sectional elevation of a modification, simply omitting the valve hereinafter disclosed.

In carrying out our invention we employ a receptacle or cylinder 1, constructed, preferably, of galvanized metal, and provide said cylinder with a disk or bottom 2, suitably attached to the inner side thereof. One way may be by suitably providing said bottom or disk with radial extensions or projections and subsequently bending them down and riveting them to the cylinder or receptacle, as at 3, so as to make a snug fit between said bottom and cylinder. The bottom or disk 2 is not arranged at the lower edge of said cylinder or receptacle but a short distance above said edge, while said cylinder or receptacle itself has a series of lateral air inlets or openings 4, arranged relatively below said bottom. Said bottom has a series of circumferential air or draft openings or recesses 5 to provide for the admission of the requisite amount of air or draft to said cylinder to promote combustion of the contents of the same when fired, the air or draft first entering the cylinder through the openings 4 and thence passing up through the openings 5.

Upon the inner side or inner circumference of the cylinder or receptacle 1 is suitably secured a series of radial or edgewise-disposed ribs or offsets 6 of such construction and arrangement as to prevent the trash or refuse when placed in said cylinder or receptacle from packing against the side thereof. These ribs or offsets at the same time provide, as it were, lateral air or draft passages, promoting the air or draft circulation throughout the contents of the burner or stove and the action or process of combustion thus increasing the efficiency or burning capacity of the stove or burner. These ribs or offsets are preferably arranged centrally with relation to the openings 5 in the bottom 2, thus serving to guard to a certain extent said openings as against the contents of the cylinder or burner falling or dropping therethrough during the process of combustion, as would otherwise be the case, the draft valve or disk being then open. Said ribs or offsets are preferably right-angled in cross-section, having their lateral portions riveted or fastened to the cylinder or receptacle and their upper ends preferably beveled or tapered upward and outward as they approach the top, permitting the upper or top layer of refuse or trash to cover in, as it were, the air passages or ducts between said ribs or offsets at the upper or top edge of the burner, but not to obstruct the draft to any appreciable extent, while the air-currents will be thus more or less disseminated laterally through the mass.

Upon the bottom 2 is centrally or axially pivoted, preferably as shown, a disk or valve 7, having a series of edge or circumferential openings or recesses 8, adapted to be adjusted or moved into or out of coincidence with the recesses or openings 5 in the bottom. This is for the purpose of closing the draft-openings 5, as desirable at the outset, or when depositing the trash or refuse in the burner before the same has been fired, to prevent said refuse from dropping or falling therethrough and yet permit said openings to be uncovered after firing the refuse for the admission of air to promote combustion.

The valve or disk 7 has a handle or arm 9, projecting through a horizontal slot or opening 10 in the cylinder, whereby the valve may be conveniently manipulated.

In the modification, as shown in Fig. 5, the same construction substantially prevails as above described, saving the omission of the valve.

Having thus fully described our invention, what we claim, and desire to secure by Letters Patent, is—

1. In a burner or stove of the character described, a cylinder or receptacle having a raised or elevated bottom provided with a series of draft or air inlets in its edge or circumference, and a series of radial or edgewise-disposed ribs or offsets arranged upon the inside of said cylinder relatively above, and about centrally of, said draft or air inlets, substantially as set forth.

2. In a burner or stove of the character described, a cylinder or receptacle having a raised or elevated bottom provided with a series of draft or air inlets in its edge or circumference, a disk valve axially or centrally pivoted upon said bottom and having a series of openings in its edge or circumference adapted to register or coincide with said draft or air inlets, and a series of radial or edgewise-disposed ribs or offsets arranged upon the inside of said cylinder relatively above, and about centrally of, said draft or air inlets, substantially as set forth.

3. In a burner of the character described, the cylinder or receptacle having an elevated bottom provided in its edge or circumference with a series of draft or air openings or inlets, said cylinder having a series of lateral initial draft openings or inlets arranged relatively below the aforesaid openings or inlets, and a series of radial ribs or offsets arranged upon the inside of said cylinder relatively above, and about centrally of the air-inlets in said elevated bottom, substantially as specified.

4. In a burner or stove of the character described, a cylinder or receptacle having an elevated bottom provided with a series of air-inlets in its edge or circumference, a series of edgewise-disposed or radial ribs or offsets, arranged upon the inside of said cylinder about centrally of, and above, said draft-inlets, a disk valve axially pivoted upon said bottom and provided with a series of openings in its edge or circumference, adapted to register or coincide with said air-inlets, said cylinder also having a series of lateral openings arranged relatively below said air-inlets, substantially as set forth.

5. In a burner or stove of the character described, a cylinder or receptacle having an elevated bottom provided with a series of air-inlets in its edge or circumference, a series of edgewise-disposed or radial ribs or offsets arranged relatively above, and about centrally of, said air-inlets, a disk valve axially or centrally pivoted upon said bottom and having a series of openings in its edge or circumference, said valve having a handle or arm extending through a horizontal slit or slot in said receptacle, said cylinder or receptacle also having a series of lateral openings relatively arranged below said air-inlets, substantially as set forth.

6. In a burner or stove of the character described, the cylinder or receptacle having an elevated bottom provided with a series of edge or circumferential air-openings, said cylinder or receptacle having a series of initial lateral air-openings arranged relatively below the aforesaid openings, a disk valve axially or centrally pivoted upon said bottom and provided with means for actuation, and a series of ribs or offsets secured to the inner side of said cylinder above and about centrally of the air-inlets in said elevated bottom, said ribs or offsets having upward and outward tapered or vanishing upper ends, substantially as specified.

In testimony whereof we affix our signatures in presence of two witnesses.

ALBERT WHITE COX.
DAVIS M. LELAND.

Witnesses:
JOHN L. MANNING,
WILLIAM BUSBY.